(12) United States Patent
Xu et al.

(10) Patent No.: US 7,466,373 B2
(45) Date of Patent: Dec. 16, 2008

(54) FLAT PANEL DISPLAYS WITH PRIMARY VIEWING ENVELOPES AWAY FROM DISPLYAY PANEL NORMAL

(75) Inventors: Ming Xu, Plano, TX (US); Jianlin Li, Plano, TX (US)

(73) Assignee: Polytronix, Inc., Richardson, TX (US)

( * ) Notice: Subject to any disclaimer, the term of this patent is extended or adjusted under 35 U.S.C. 154(b) by 421 days.

(21) Appl. No.: 11/306,588

(22) Filed: Jan. 3, 2006

(65) Prior Publication Data

US 2007/0153543 A1 Jul. 5, 2007

(51) Int. Cl.
G02F 1/1335 (2006.01)
B64D 47/06 (2006.01)
(52) U.S. Cl. .............................. 349/61; 349/62; 349/64; 362/559
(58) Field of Classification Search .................... 349/61, 349/62, 64; 362/559
See application file for complete search history.

(56) References Cited

U.S. PATENT DOCUMENTS

| | | | | |
|---|---|---|---|---|
| 3,701,368 A | * | 10/1972 | Stern | ............................ 141/1 |
| 6,023,316 A | * | 2/2000 | Yano | ........................... 349/112 |
| 6,174,064 B1 | * | 1/2001 | Kalantar et al. | ............. 362/255 |
| 6,846,089 B2 | * | 1/2005 | Stevenson et al. | ........... 362/627 |
| 2006/0002149 A1 | * | 1/2006 | Lee et al. | ..................... 362/627 |

* cited by examiner

*Primary Examiner*—Mike Qi
(74) *Attorney, Agent, or Firm*—Scott T. Griggs; Griggs Bergen LLP

(57) ABSTRACT

A flat panel display is disclosed. In one embodiment, display normal light that is parallel to a display normal of the flat panel is provided. Spaced light redirecting prisms receive the display normal light and redirect the display normal light to redirected light, which is non-parallel to the display normal. A flat surface portion is posteriorly coupled to the plurality of spaced light redirecting prisms such that the flat surface portion spans the spaces between the plurality of spaced light redirecting prisms. The flat surface portion receives the display normal light from the light guide and receives the redirected light from the plurality of spaced light redirecting prisms and propagates both to a display.

20 Claims, 3 Drawing Sheets

FLAT PANEL DISPLAYS WITH PRIMARY VIEWING ENVELOPES AWAY FROM DISPLYAY PANEL NORMAL

BACKGROUND OF THE INVENTION

1. Field of the Invention

The present invention relates generally to the field of flat panel displays. More specifically, the present invention discloses a technique using a light re-distributor (LRD) for increasing the brightness of a display at viewing envelopes/angles that are away from the direction that is perpendicular to the display panel (display normal).

2. Statement of the Problem

Normally, displays are brightest when viewed along the display normal direction and brightness decreases with the increase of viewing angles. In the case of an LCD, a diffuser behind the display panel roughly defines the angle distribution of the illumination. A good diffuser gives approximately Lambertian distribution, that is, the brightness is proportional to $\cos^2(\theta)$, where $\theta$ is the angle between the viewing direction and the display normal. The brightness of an actual display may decrease faster than the Lambertian distribution because of the reflection of the surfaces of the display panel in front of the diffuser. The luminance at the display normal can be a couple of times larger than the luminance at a large viewing angle, say 60° from the display normal.

In certain situations, such as in the cockpit of a transport aircraft, the pilot's and the co-pilot's primary viewing directions can be at very large angles, say 50°, from left and right. The primary viewing envelopes are then centered on the −50° and +50° degrees horizontal and the viewing envelope centered on the display normal is secondary. In other cases, such as displays in other types of aircrafts and automobiles, the primary viewing directions can also be away from the display normal. In all these cases, it is desirable to increase the brightness at the primary viewing envelopes. In some cases, it is even more desirable for the display to be brighter at primary viewing envelopes than at the secondary. A technique to boost the brightness of these primary viewing envelopes is of importance.

We disclose a method of increase the brightness of the primary viewing envelopes away from display normal using a light re-distributor.

3. Prior Art

A scheme of redirecting light of display has been proposed in U.S. Pat. No. 5,303,322. A so-called image redirect film redirects the light to a certain angle of viewing [1]. FIG. 1 is a description of the prior art. Compare to the method disclosed in this application, the prior art has the following limitations: 1). It redirects light to one direction or envelope but not to multiple directions or envelopes. 2). It can only be achieved with a special prismatic film and not with other optical elements that can be more cost effective. 3). It shows an artifact that when close to the cut-off angle, the brightness changes dramatically if the viewer moves his head slightly. This artifact may also cause luminance non-uniformity problem if the display is large or if a few small displays is put side by side so that the total display area extends a certain viewing angle range to a fixed eye position.

4. Solution to the Problem

The present invention provides a flat panel display that uses a light re-distributor (LRD) to re-distribute light between the primary and secondary viewing envelopes of a display. This approach successfully addresses the problem of a conventional display's being much brighter at the display normal than at larger viewing angles and boosts up the brightness of the display at larger viewing angles. The present invention has the following advantages:

(1) Increase the brightness of the display at the primary viewing envelopes that are away from the display normal. For displays primarily viewed from large viewing angles, or viewed from a wide range of angles (such as TV set), this invention is valuable.

(2) Reduce power consumption requirement because the required brightness at primary envelopes can be achieved with a less bright backlight so that it uses less power. And, running at a lower backlight power, the backlight, and the display to a certain degree, will have a longer lifetime.

(3) No disturbance to the overall lighting of the environment where the viewer is in so that the viewing of other displays or other information will not be affected. Without the use of this invention, when the display achieves the brightness requirement at the primary viewing envelopes, the brightness at the secondary viewing envelope, i.e., around the display normal, can be so bright that it interferes with the overall lighting.

(4) Cosmetic defects are less visible. While boost the brightness at larger viewing angles, this invention reduces the visibility of small manufacturing cosmetic defects in the display panel by reducing the intensity of backlight illumination at the display normal. Defects are much less visible when backlight is less intense. This invention redirect a portion of the light otherwise coming out of the display normal to larger viewing angles so that they are less visible at the display normal.

(5) Provides multiple ways of realizing the desired effects. It is of low cost, easy to manufacture because of the fact that it can be made of different kinds of and commercially available materials.

SUMMARY OF THE INVENTION

An LCD consists of a display panel with driving electronics, a backlight assembly (for transmissive or transflective displays) and a bezel/housing to hold everything together. The light from the backlight is spatially modulated by the pixels of the display panel to form the desired information on the panel. The backlight consists of emitter(s) with some optical components such as a light guide or cavity, diffusers, and performance enhancement optical elements. The light source can be fluorescent tubes, incandescent bulbs or LEDs. The light source can be at the edge of the light guide or cavity (edge-lit). Or, it can be at the bottom of the cavity or guide (bottom-lit). The light emitters, light guide/cavity and diffusers together form a uniform extended surface light source, which is brightest at the direction of the display normal. In many conditions, such as desktop monitors of personal computers, it is desirable to have a display being brightest at the display normal. In fact, there are products, such as the brightness enhancement (BEF) films from 3M Company that are used to enhance the brightness of the display at the display normal, at the cost of reducing the brightness at larger viewing angles. BEF films have a prismatic surface and a essentially flat surface. The prismatic surface of the BEF film faces the rear substrate of the display panel in its intended use.

As discussed in previous paragraphs, at certain circumstances, it is highly desirable to have a display that is bright at large viewing angles and even brighter than at display normal. This invention provides ways of increasing the brightness at the primary viewing envelopes that are away from the display normal. The key element of this invention, the light re-distributor (LRD), uses the principles of light diffraction and scattering to re-distribute the light output from the diffuser of the backlight assembly between the viewing envelopes. In one embodiment, the LRD is constructed as a thin optical element with interlaced light re-directing portion and light straight transmission portion. The viewing angles at which the display is brightest are mostly determined by the surface profile of light re-directing portion. The ratio of these two portions determines the ratio of the brightness between the viewing envelopes. In another embodiment, a commercially available BEF film and a diffuser film are used together to achieve the desired effect. BEF films are intended to be used and have been used by others to increase the brightness at the display normal. We use the BEF film in a way that has not been used before. That is, we use the film with the prismatic side facing the backlight assembly. And, using the BEF film only is often not enough to achieve the goal. We add a diffuser film with the right scattering power to adjust the ratio of the light between the viewing envelopes and to smooth out the boundaries between the primary and secondary envelopes so that the artifact mentioned earlier will not be observed.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
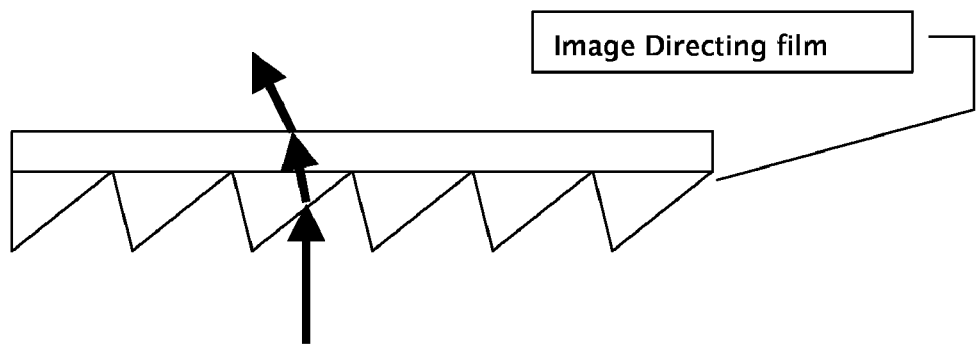
FIG. 1 is a schematic diagram illustrating the structure of the prior art.
Figure 2:
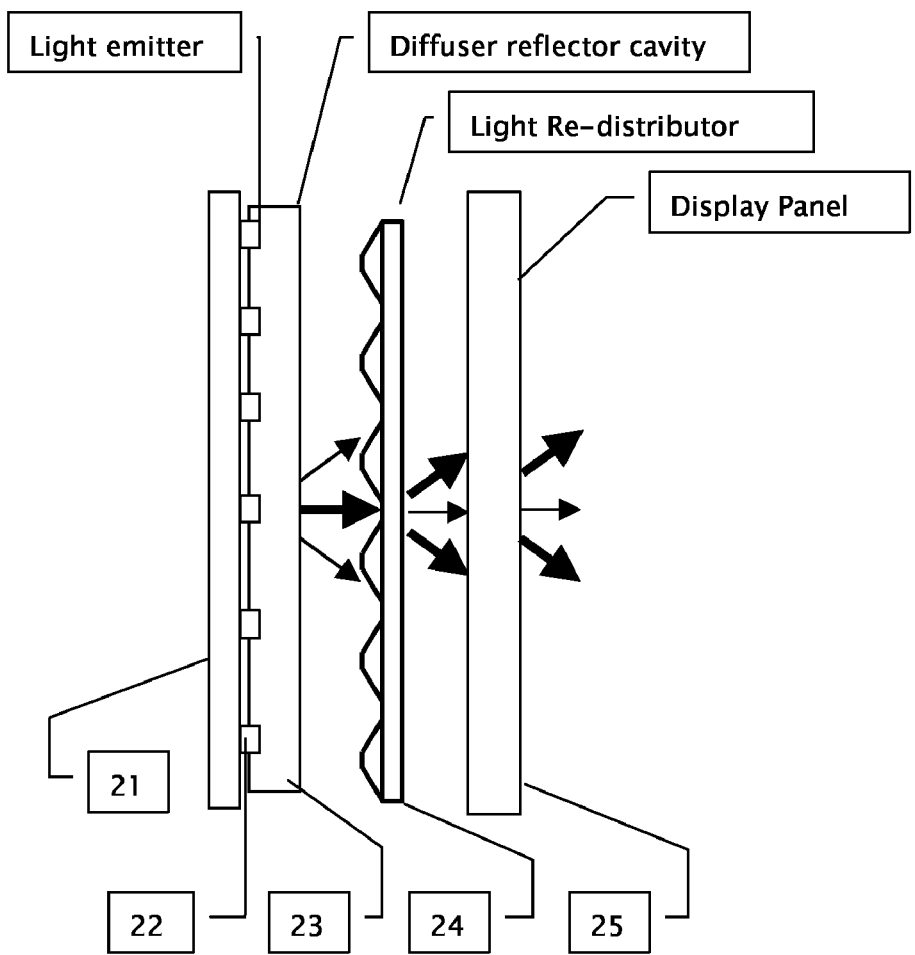
FIG. 2 is a schematic diagram of a flat panel display implementing the present invention.
Figure 3:
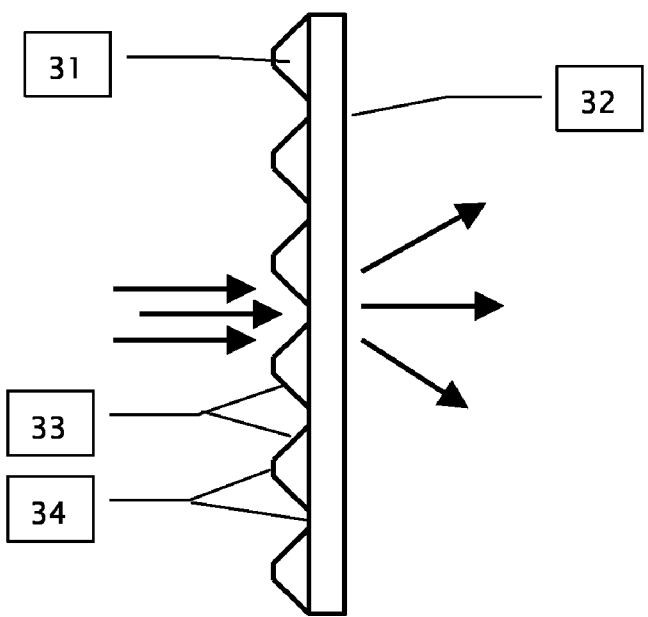
FIG. 3 is a schematic diagram illustrating one preferred embodiment of the LRD in the present invention.

Turning to FIG. 2, a schematic diagram is provided of a flat panel display implementing the present invention. Light comes from the light emitters 22 mounted on support 21. The light emitters can be fluorescent tubes, LEDs, electroluminescent or incandescent bulbs etc. Light is then integrated by the cavity or light guide 23 with diffuser/reflector walls to form a uniform extended surface source. If this light source is used directly to illuminate the display panel 25, the display will be brightest at the display normal. To increase the brightness of the display at the primary viewing envelopes that are away from the display normal, we add an optical element, the light re-distributor 24 in between the backlight cavity and display panel 25. The working principle of the LRD 24 can be readily understood with the assist of FIG. 3. The LRD contains an essentially segmented surface 31 and an essentially flat surface 32. The segmented surface consists of different portions, including a light re-directing portion 33 with surface elements forming certain angles to the flat surface 32. The line segments of 33 can be straight so that each segment forms a portion of a prism with the flat surface 32. A prism changes the propagation direction of light rays passing through it. The angle between the directions before and after passing the prism is determined by the angle that the light re-directing portion 33 makes to the flat surface. The light re-directing portion 33 has multiple segments; each can make a different angle with the substrate so that it can direct light into multiple directions. The segments of the light re-directing portion 33 can also be curved so that they can direct parallel light rays hitting different points at a segment into a continuous range of different directions.

The light straight transmission portion 34 is mostly flat so that light rays passing through this portion essentially without changing direction. The boundaries between the re-direct and straight transmission portions, however, should preferably be smooth to avoid light scattering that causes a decrease of transmittance.

The pattern on the light redistribution side of a LRD can be periodic. The pitch of it can very from the order of 10 microns to the order of 100 microns. If the pitch is too small, being comparable to the wavelength of the light, the light wave interference effect would cause brightness modulations and strong color dispersions. If the pitch is too larger, the patterns on the LRD may become visible to the viewer, which is not desirable.

The patterns can be a two dimensional array to re-distribute light in two dimensions. In this case, the light-redirecting portion consists of two-dimensional arrays of cones or domes. In certain cases, the primary and secondary viewing envelopes cover a wide range of horizontal angles but covers very limited vertical angle range. An LRD with two-dimensional structures can be used to boost brightness at large horizontal viewing angles and reduce brightness at large vertical viewing angle. A way of achieving this effect is to laminate two LRD films showed in FIG. 3 back to back with the light re-directing portions facing outside of the laminated structure and the stripes of light redirecting prisms on the two outer surfaces being perpendicular to each other.

Figure 4:
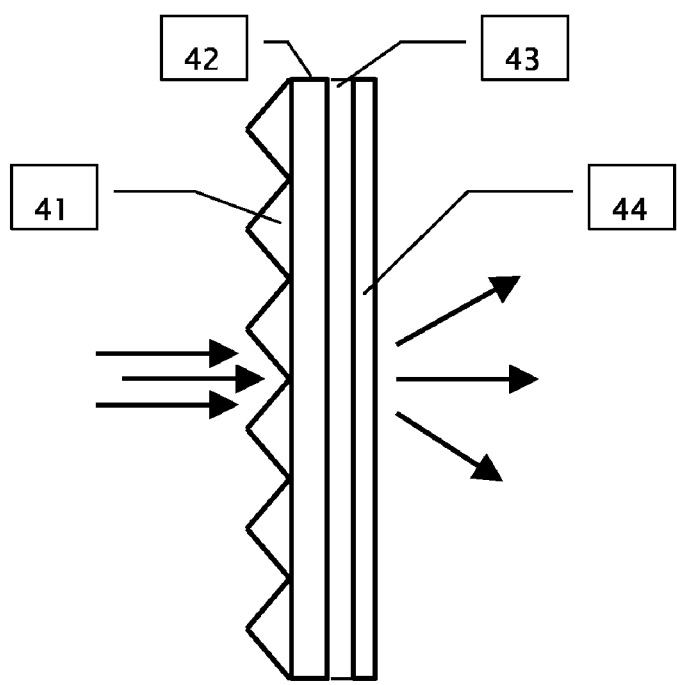
FIG. 4 is a schematic diagram illustrating another preferred embodiment of the LRD in the present invention.

Another embodiment of the present invention is shown in FIG. 4 where a light re-directing element 41 is laminated to a diffuser element 44 through a refractive index matching adhesive 43. 42 is the substrate for 41. The light re-directing element can be a commercially available element, such as 3M's brightness enhancement films (BEF). There are a couple of different kinds of BEF films, including regular prismatic films with a 90 degree prism angle and 20 to 50 micro-meter pitches, films that are the same as regular prismatic films except that the prism angle been rounded (RBEF) and films with the prism profile being sinusoidal or wave-like (WBEF). As mentioned earlier, these films are intended to enhance the brightness of the display at the display normal. The prismatic side of the film must face the display panel in its intended use. For the purpose of this invention, these BEF films are used in a new way that the prismatic side of the film faces the backlight. In this way, the BEF film is found to be able to direct light away from the cell normal. The regular BEF films direct more light from the display normal into large viewing angles than the RBEF and WBEF films do. At the time of this invention, the WBEF films have been discontinued and the RBEF film is soon going to be discontinued. We choose to use the regular BEF film. The film has several disadvantages when being used for re-directing light into larger angles. 1). It shows an artifact of sharp brightness change from the secondary viewing envelope at display normal to the primary viewing envelopes at larger angles. The artifact is very noticeable when the viewer moves his head across the boundaries of the envelopes. 2). The ratio of the brightness at the secondary and primary viewing envelopes is fixed and may not be desirable. 3). The angle of the maximum brightness direction is also fixed. To overcome these disadvantages, we laminate a diffuser 44 to the BEF film to form a LRD. The diffuser will smooth out the sharp brightness change at the boundaries of the viewing envelopes and redefine the ratio of the brightness between different envelopes. The diffuser should have the right scattering power and minimum absorption of light. If it diffuses light too strong, the LRD will loss most of its light-redistribution power. If it hardly diffuses light, then it won't be able to overcome the disadvantages of a BEF mentioned above. There are commercially available diffusers with a range of different levels of scattering power. To increase the overall transmission of the LRD, an index matching adhesive 43 is used to laminate the BEF film and the diffuser together.

Figure 5A:
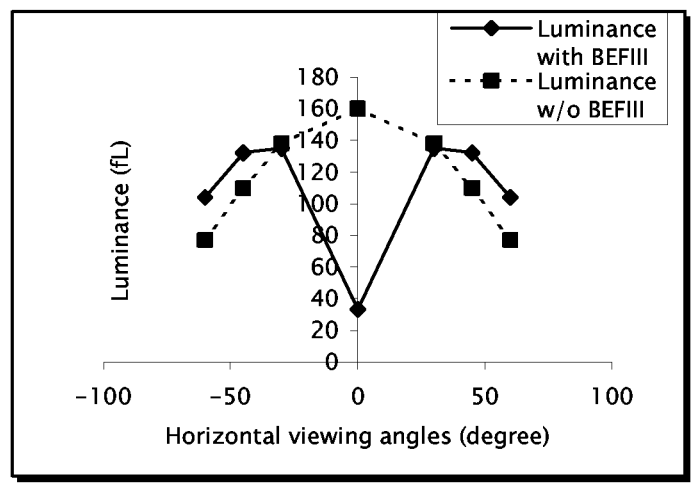
FIGS. 5A to 5C are experiment data as examples of the effects achieved by the present invention.
Figure 5B:
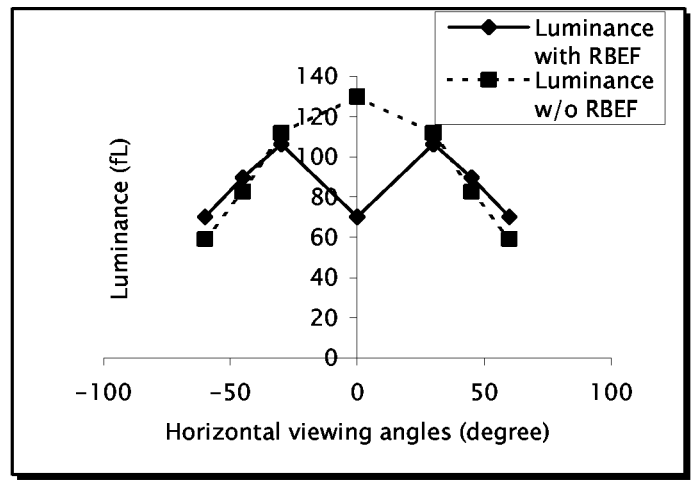
Figure 5C:
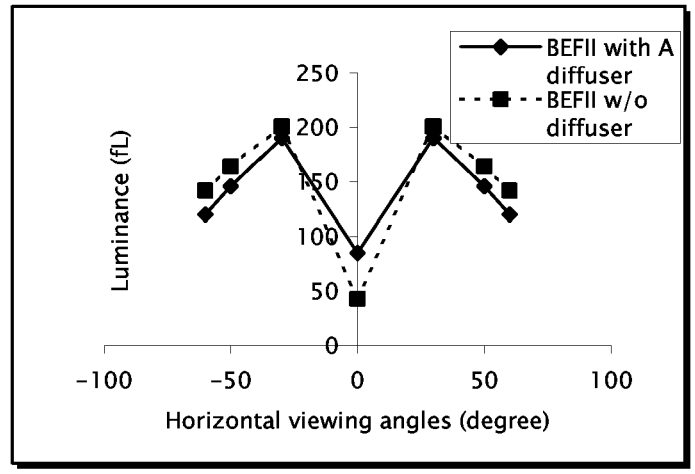

FIGS. 5A to 5C show a few instances of the measured light distribution using LRDs that consist of commercially available components. In the measurement, we used a Heilmeier type of LCD [2] as the display panel that has a symmetrical left and right viewing angle characteristics, a bottom lit white LED array with reflector/diffuser/light guide as backlight assembly. FIG. 5A compares the brightness of a display with and without a light redistribution element. As expected, the brightness peaks at the display normal if no LRD is present and peaks at about plus and minus 40 degrees horizontal if a BEF film is used as a LRD. It can be seen that the BEF film decreases the brightness drastically at the display normal and that the slope of the brightness curve from 0 to +/−40 degrees is steep. If a RBEF film is used as a LRD, the slope is not as steep, shown as the solid line in FIG. 5B. This could be an advantage of using RBEF as a LRD. A disadvantage of RBEF film is that the ratio of the brightness between the primary and secondary envelopes is fixed and is not adjustable. FIG. 5C shows the effect of combining a BEF film with a diffuser film. The steepness of the brightness versus viewing angle curve between the primary and secondary viewing envelopes can be adjusted by choosing diffuser films of different scattering power. Because diffuser films of different scattering power are readily available and is very cost effective, this embodiment of laminating a BEF film with a diffuser film of certain scattering power is very versatile for satisfying various requirements. The LRD of this type is easy to manufacture and cost effective.

In above discussions, we use an LRD on the back of the display panel to re-distribute the light. The LRD can also be placed on top of the display panel, between the display and the eyes of the viewer. Now, the light re-directing side of the LRD should face the front substrate of the display and the essentially flat, light transmitting or diffusing side faces the viewer. This configuration is especially useful for redistributing the light of displays that emit light, such as field emission displays (FED) or organic LED (OLED) displays.

It should be expressly understood that the applications of the LRD discussed above could be readily extended to displays other than LCD, LED and FED displays.

The above disclosure sets forth a number of embodiments of the present invention. Other arrangements or embodiments, not precisely set forth, could be practiced under the teachings of the present invention and as set forth in the following claims.

What is claimed is:

1. A flat panel display having a display normal, the flat panel display comprising:
a plurality of light emitters providing light;
a light guide adapted for receiving the light, the light guide including a cavity defined by diffuser/reflector walls for integrating the light to form an extended light surface source providing display normal light, the display normal light being parallel to the display normal;
a plurality of spaced light redirecting segments including straight transmission portions and redirecting portions, the straight transmission portions for receiving the display normal light from the extended light surface and permitting the display normal light to pass therethrough, the redirecting portions for receiving the display normal light from the extended light surface and redirecting the display normal light to redirected light, the redirected light being non-parallel to the display normal;
a flat surface portion posteriorly coupled to the plurality of spaced light redirecting segments and spanning the spaces between the plurality of spaced light redirecting segments, the flat surface portion for receiving the display normal light from the light guide and the plurality of spaced light redirecting segments, the flat surface portion for receiving the redirected light from the plurality of spaced light redirecting segments; and
a display panel having a plurality of pixels for spatially modulating both the display normal light and the redirected light received from the flat surface portion to form a pattern.

2. The flat panel display as recited in claim 1, wherein the plurality of light emitters are selected from the group consisting of fluorescent tubes, LEDs, electroluminescent bulbs, and incandescent bulbs.

3. The flat panel display as recited in claim 1, wherein the plurality of spaced light redirecting segments further comprises a plurality of spaced light redirecting prisms.

4. The flat panel display as recited in claim 1, wherein the plurality of spaced light redirecting segments further comprises smooth surfaces at boundaries between the straight transmission portions and the redirecting portions.

5. The flat panel display as recited in claim 1, wherein the plurality of spaced light redirecting segments further comprises a plurality of different contact angles with the flat surface portion.

6. The flat panel display as recited in claim 1, wherein the redirecting portions of the plurality of spaced light redirecting segments further comprise curved surfaces that redirect the display normal light to redirected light having a continuous range.

7. The flat panel display as recited in claim 1, wherein the flat surface portion further comprises essentially flat surfaces on the receiving and transmitting sides.

8. The flat panel display as recited in claim 1, wherein the plurality of spaced light redirecting segments and the flat surface portion comprises a brightness enhancement film.

9. A flat panel display having a display normal, the flat panel display comprising:
a plurality of light emitters providing light;
a light guide adapted for receiving the light, the light guide including a cavity defined by diffuser/reflector walls for integrating the light to form an extended light surface source providing display normal light, the display normal light being parallel to the display normal;
a film disposed posteriorly to the light guide, the film including a means for permitting a first portion of the display normal light to pass therethrough and a means for redirecting a second portion of the display normal light to redirected light, the redirected light being non-parallel to the display normal, the film and the means for redirecting the second portion of the display normal light forming a prism surface facing the light guide; and
a display panel having a plurality of pixels for spatially modulating both the display normal light and the redirected light received from the film to form a pattern.

10. The flat panel display as recited in claim 9, wherein the plurality of light emitters are selected from the group consisting of fluorescent tubes, LEDs, electroluminescent bulbs, and incandescent bulbs.

11. The flat panel display as recited in claim 9, wherein the film comprises a brightness enhancement film.

12. The flat panel display as recited in claim 9, wherein the film further comprises a prismatic surface on a receiving side of the film, the receiving side being disposed proximate to the light guide.

13. The flat panel display as recited in claim 9, wherein the film further comprises an essentially flat surfaces on a transmitting side of the film, the transmitting side being disposed distal to the light guide.

14. A flat panel display having a display normal, the flat panel display comprising:
   a plurality of light emitters providing light;
   a light guide adapted for receiving the light, the light guide including a cavity defined by diffuser/reflector walls for integrating the light to form an extended light surface source providing display normal light, the display normal light being parallel to the display normal;
   a brightness enhancement film for receiving the display normal light from the light guide and permitting a first portion of the display normal light to pass therethrough and redirecting a second portion of the display normal light to redirected light, the redirected light being non-parallel to the display normal, the brightness enhancement film including a prism surface facing the light guide;
   a diffuser element bonded to the brightness enhancement film by a refractive index matching adhesive, the diffuser element for receiving both the display normal light and redirected light and smoothing out the sharp boundaries therebetween; and
   a display panel having a plurality of pixels for spatially modulating both the smoothed display normal light and the smoothed redirected light received from the diffuser element to form a pattern.

15. The flat panel display as recited in claim 14, wherein the plurality of light emitters are selected from the group consisting of fluorescent tubes, LEDs, electroluminescent bulbs, and incandescent bulbs.

16. The flat panel display as recited in claim 14, wherein the brightness enhancement film further comprises a plurality of spaced light redirecting segments including redirecting portions, the redirecting portions for receiving the display normal light from the extended light surface and redirecting the display normal light to redirected light, the redirected light being non-parallel to the display normal.

17. The flat panel display as recited in claim 14, wherein the brightness enhancement film further comprises a flat surface portion posteriorly coupled to the plurality of spaced light redirecting segments and spanning the spaces between the plurality of spaced light redirecting segments, the flat surface portion for receiving the display normal light from the light guide, the flat surface portion for receiving the redirected light from the plurality of spaced light redirecting segments.

18. The flat panel display as recited in claim 14, wherein the brightness enhancement film further comprises a prismatic surface on a receiving side of the film, the receiving side being disposed proximate to the light guide.

19. The flat panel display as recited in claim 14, wherein the brightness enhancement film further comprises an essentially flat surfaces on a transmitting side of the film, the transmitting side being disposed distal to the light guide.

20. The flat panel display as recited in claim 14, wherein the diffuser element comprises a material having light scattering characteristics.

* * * * *

UNITED STATES PATENT AND TRADEMARK OFFICE
CERTIFICATE OF CORRECTION

| | |
|---|---|
| PATENT NO. | : 7,466,373 B2 |
| APPLICATION NO. | : 11/306588 |
| DATED | : December 16, 2008 |
| INVENTOR(S) | : Ming Xu et al. |

It is certified that error appears in the above-identified patent and that said Letters Patent is hereby corrected as shown below:

<u>Title Page, Item [54], Title</u>

In the Title, "DISPLYAY" should read --DISPLAY--

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,466,373 B2  
APPLICATION NO.  : 11/306588  
DATED            : December 16, 2008  
INVENTOR(S)      : Ming Xu et al.

Page 1 of 1

It is certified that error appears in the above-identified patent and that said Letters Patent is hereby corrected as shown below:

Title Page, Item [54] and Column 1, line 3, Title

In the Title, "DISPLYAY" should read --DISPLAY--

This certificate supersedes the Certificate of Correction issued February 10, 2009.

Signed and Sealed this

Tenth Day of March, 2009

JOHN DOLL  
*Acting Director of the United States Patent and Trademark Office*